United States Patent
Lauwick et al.

(10) Patent No.: US 12,377,962 B2
(45) Date of Patent: Aug. 5, 2025

(54) METHOD FOR CORRECTING THE RADIAL MOMENT WEIGHT OF A VANE FOR AN AIRCRAFT TURBINE ENGINE

(71) Applicant: SAFRAN AIRCRAFT ENGINES, Paris (FR)

(72) Inventors: Lucas Antoine Christophe Lauwick, Moissy-Cramayel (FR); Maxime Mathieu Mourot, Moissy-Cramayel (FR); Didier Queant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/690,459

(22) PCT Filed: Sep. 5, 2022

(86) PCT No.: PCT/FR2022/051667
§ 371 (c)(1),
(2) Date: Mar. 8, 2024

(87) PCT Pub. No.: WO2023/037065
PCT Pub. Date: Mar. 16, 2023

(65) Prior Publication Data
US 2025/0100673 A1 Mar. 27, 2025

(30) Foreign Application Priority Data
Sep. 10, 2021 (FR) .................................... 2109492

(51) Int. Cl.
*B64C 11/00* (2006.01)
*F04D 29/66* (2006.01)
*G01M 1/32* (2006.01)

(52) U.S. Cl.
CPC .......... *B64C 11/008* (2013.01); *F04D 29/662* (2013.01); *G01M 1/32* (2013.01)

(58) Field of Classification Search
CPC ........ F04D 29/662; F01D 5/027; G01M 1/30; G01M 1/32; B64C 11/008; F16F 15/32;
(Continued)

(56) References Cited

U.S. PATENT DOCUMENTS

| | | | |
|---|---|---|---|
| 9,885,241 B2 * | 2/2018 | Bakker | .................. F01D 5/027 |
| 2010/0189561 A1 * | 7/2010 | Vettese | .................. F03D 1/065 29/889.7 |

(Continued)

FOREIGN PATENT DOCUMENTS

| | | |
|---|---|---|
| EP | 3 812 547 A2 | 4/2021 |
| FR | 2 906 320 A1 | 3/2008 |

(Continued)

OTHER PUBLICATIONS

International Search Report mailed Oct. 26, 2022, issued in corresponding International Application No. PCT/FR2022/051667, filed Sep. 5, 2022, 8 pages.

(Continued)

*Primary Examiner* — Courtney D Heinle
*Assistant Examiner* — Ryan C Clark
(74) *Attorney, Agent, or Firm* — CHRISTENSEN O'CONNOR JOHNSON KINDNESS PLLC

(57) ABSTRACT

A method for correcting the radial moment weight of a vane, includes the step of providing a vane extending along an axis of elongation (Z) between a free end and an opposite root, the vane having a blade made of composite material and having a leading edge. The method further includes the steps of measuring the radial moment weight of the vane and comparing the measured radial moment weight to a reference value and adjusting the radial moment weight of the (Continued)

vane according to the result of the comparison. The vane has at least one adjustment cavity extending along the leading edge and opening into the free end of the vane. The adjustment is carried out by inserting a first material into the adjustment cavity.

11 Claims, 6 Drawing Sheets

(58) Field of Classification Search
CPC ............... F16F 15/326; F05D 2230/10; F05D 2240/303; F05D 2240/304; F05D 2260/15
See application file for complete search history.

(56) References Cited

U.S. PATENT DOCUMENTS

| | | | | |
|---|---|---|---|---|
| 2010/0232974 A1* | 9/2010 | De Moura | ............ | F04D 29/668 416/230 |
| 2014/0030106 A1* | 1/2014 | Schreiber | .............. | F04D 29/324 156/60 |
| 2014/0030107 A1* | 1/2014 | Schreiber | .............. | F04D 29/322 416/241 A |
| 2017/0174316 A1* | 6/2017 | Huddleston, Jr. | ...... | G05D 13/00 |
| 2019/0047682 A1* | 2/2019 | Haldeman | ........... | B64C 29/0033 |
| 2020/0149552 A1* | 5/2020 | Vanden Berg | ........ | F04D 29/281 |
| 2021/0003017 A1* | 1/2021 | Garner | ...................... | F01D 5/16 |
| 2021/0123347 A1* | 4/2021 | Molnar, Jr. | ........... | F04D 29/023 |

FOREIGN PATENT DOCUMENTS

| | | |
|---|---|---|
| FR | 2 962 483 A1 | 1/2012 |
| FR | 2 989 991 A1 | 11/2013 |
| FR | 3 026 033 A1 | 3/2016 |
| FR | 3 102 378 A1 | 4/2021 |
| FR | 3118093 A1 * | 6/2022 |
| GB | 2484726 A | 4/2012 |

OTHER PUBLICATIONS

Written Opinion mailed Oct. 26, 2022, issued in corresponding International Application No. PCT/FR2022/051667, filed Sep. 5, 2022, 7 pages.

* cited by examiner

METHOD FOR CORRECTING THE RADIAL MOMENT WEIGHT OF A VANE FOR AN AIRCRAFT TURBINE ENGINE

FIELD OF THE DISCLOSURE

The disclosure relates to the technical field of vanes for aircraft turbine engine, in particular fan vanes.

BACKGROUND

The prior art is illustrated by the documents FR-A1-2906320, FR-A1-2962483, GB-A-2484726, FR-A1-2989991, FR-A1-3026033, FR-A1-3102378, US-A1-2014030106, US-A1-2014030107 and EP-A2-3812547.

As is well known, an aircraft turbine engine extends along a longitudinal axis and comprises, from upstream to downstream in the direction of gas flow, a fan, a low-pressure compressor and a high-pressure compressor, an annular combustion chamber, a high-pressure turbine and a low-pressure turbine and finally a gas exhaust nozzle.

The fan comprises a central disk rotating around an axis of rotation. The axis of rotation is, for example, the longitudinal axis of the turbine engine. The central disk is surmounted by a plurality of vanes for the initial compression of the air entering the turbine engine. The vanes are surrounded by a retaining casing which allows the vanes to be retained in the event of their breakage.

A fan vane is generally composed of a blade with an aerodynamic profile comprising a leading edge and a trailing edge joined by a pressure side and a suction side opposite the pressure side. The blade also comprises an upper end and an opposite lower end connected to a root. The root is designed to cooperate with a corresponding groove of the central disk to attach the vane to the central disk.

To reduce the weight of the fan, the blade of the vane is made from a composite material, typically an organic matrix composite (OMC). The composite material comprises a polymer matrix, for example a thermoplastic or thermosetting matrix, and fibers such as carbon fibers or glass fibers embedded in the matrix.

In addition, in order to protect the leading edge from erosive wear and/or damage caused by impact with foreign bodies, the leading edge is covered with a metal protective shield. The shield is assembled and glued to the leading edge. To do this, the leading edge or shield is coated with an adhesive layer, then the shield is assembled on the leading edge. The assembly is then subjected to heat treatment to ensure polymerization of the adhesive layer. The shield is attached to the leading edge.

After manufacture, each vane is mounted on the central disk according to its own inertia and its relative inertia in relation to the neighboring vanes. This meticulous mounting is referred to as "balancing". Balancing the fan is essential to prevent rotation inducing a force perpendicular to the axis of rotation and prematurely wearing out the central disk and the turbine engine, as well as ensuring better efficiency and optimum performance.

To balance the fan, it is necessary to balance the forces generated by the vanes relative to the axis of rotation. The force generated by a vane is called the radial moment weight (RMW). The radial moment weight of a vane is equal to the mass of the vane multiplied by the distance between the center of gravity of the vane and the axis of rotation. When the radial moment weight of each vane is equal to that of the others, the rotor of the fan is perfectly balanced. The life of the rotor depends in part on how well it is balanced: the better balanced the rotor, the less wear and tear it suffers.

However, the manufacturing methods for the vanes result in a significant dispersion of the radial moment weight of the vanes. In order to balance the rotor perfectly, balancing flyweights have been known to be added to the cone of the module of the fan when the fan is mounted on the turbine engine. Without such balancing, an unbalance will occur and the rotor will wear out prematurely.

This solution is not entirely satisfactory in that it allows the radial moment weight to be adjusted on the entire set of vanes of the fan, i.e. after the fan has been mounted and not on the individual vanes before they are mounted. In addition, this solution involves the use of attached parts, which complicates the mounting of the fan.

As a result, there is a need to provide a method for limiting the radial moment weight dispersion of the vanes in order to facilitate the mounting of the fan whilst ensuring the balancing of the latter.

SUMMARY

To this end, the disclosure proposes a method for correcting the radial moment weight of a vane for an aircraft turbine engine, the method comprising the following steps:
(a) providing a vane extending along an axis of elongation Z between a free end opposite a root, the vane comprising a blade made of composite material having a leading edge, a trailing edge connected to the leading edge by a suction side and a pressure side opposite the suction side, the vane further comprising a protective shield attached to the leading edge,
(b) measuring the radial moment weight of the vane,
(c) comparing the measured radial moment weight with a reference value and adjusting the radial moment weight of the vane as a function of the result of the comparison.

The method is characterized in that, in step (a), the vane comprises at least one adjustment cavity extending along the leading edge and opening onto the free end of the vane, and in that, in the step, the adjustment is carried out by inserting a first material into the adjustment cavity.

According to the disclosure, the radial moment weight of the vane is first measured after manufacture and then compared with a reference value. The radial moment weight is then adjusted to match the reference value. In fact, the adjustment cavity allows the addition of at least one first material to adjust the radial moment weight of the vane. The radial moment weight of each vane can then be adjusted on a case-by-case basis, thereby limiting the dispersion of the radial moment weight of the vanes. This reduces the risk of creating an unbalance when mounting the vanes on the fan, and eliminates the need for additional balancing flyweights. In addition, the cavity is accessible via the end of the vane, which makes it easier to insert the first material when the vane is manufactured. Such a method also enables the radial moment weight of the vane to be adjusted precisely. The radial moment weight of the vane is measured at the end of the manufacturing phase of the vane, allowing the precise adjustment required to be determined.

The method according to the disclosure may comprise one or more of the following characteristics, taken alone or in combination with each other:
in step (c) the adjustment is carried out by inserting a second material into the adjustment cavity, the density of the first material being different from the density of the second material;
the first material is lead;

the quantity of the first material is between 5 g and 50 g, and preferably between 10 g and 30 g;

the adjustment cavity is formed in the protective shield;

the protective shield comprises a first lateral fin extending over at least part of the suction side, a second lateral fin extending over at least part of the pressure side, a central portion connecting the first and second lateral fins and extending along the leading edge along the axis of elongation, the adjustment cavity being formed in the central portion;

the adjustment cavity extends over the entire height of the leading edge along the axis of elongation;

the vane comprises an adhesive layer disposed between the blade and the protective shield, the adjustment cavity being formed in the adhesive layer;

step (a) comprises the following sub-step (a1): forming the adjustment cavity in the vane;

at the end of sub-step (a1), the adjustment cavity has an upper longitudinal end opposite the root and a lower longitudinal end opposite the upper longitudinal end along the longitudinal axis which are closed, and in that the method comprises, after sub-step (a1), the following sub-step (a2): cutting or removing an end portion of the vane, opposite the root, so as to open the upper longitudinal end of the adjustment cavity.

DESCRIPTION OF THE DRAWINGS

Further characteristics and advantages will be apparent from the following description of a non-limiting embodiment of the disclosure with reference to the appended drawings in which.

DETAILED DESCRIPTION

Figure 1:
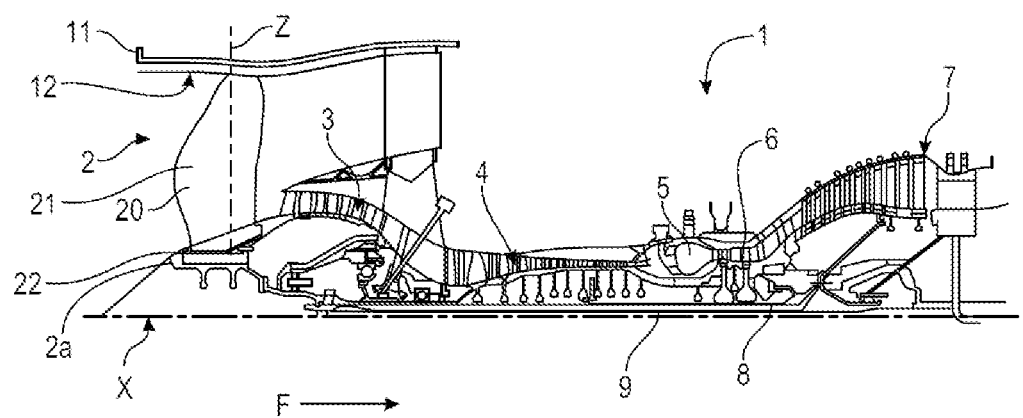
FIG. 1 is a schematic representation of an aircraft turbine engine.

An aircraft turbine engine 1 is shown in FIG. 1, for example. The turbine engine 1 extends along a longitudinal axis X. The turbine engine 1 comprises, from upstream to downstream in the direction of gas flow F, a fan 2, a low-pressure compressor 3, a high-pressure compressor 4, at least one annular combustion chamber 5, a high-pressure turbine 6, a low-pressure turbine 7 and a gas exhaust nozzle (not shown).

The high-pressure turbine 6 comprises a rotor which rotates a rotor of the high-pressure compressor 4 via a high-pressure shaft 8. The low-pressure turbine 7 comprises a rotor which rotates the rotor of the low-pressure compressor 3 and the fan 2 via a low-pressure shaft 9.

The rotor of the fan 2 consists of a central disk 2a surmounted by a plurality of vanes evenly distributed around the circumference of the central disk 2a. The disk 2a is mobile in rotation about the longitudinal axis X. The vanes 20 of the fan 2 are, for example, surrounded by a retaining casing 11 designed to retain the vanes 20 in the event of their breakage. The retaining casing 11 has an internal surface coated with a layer of abradable material 12. The layer of abradable material 12 is a layer that can be worn by friction with the vanes 20. The vanes 20 according to the disclosure are therefore, for example, vanes of the fan 2.

Figure 2:
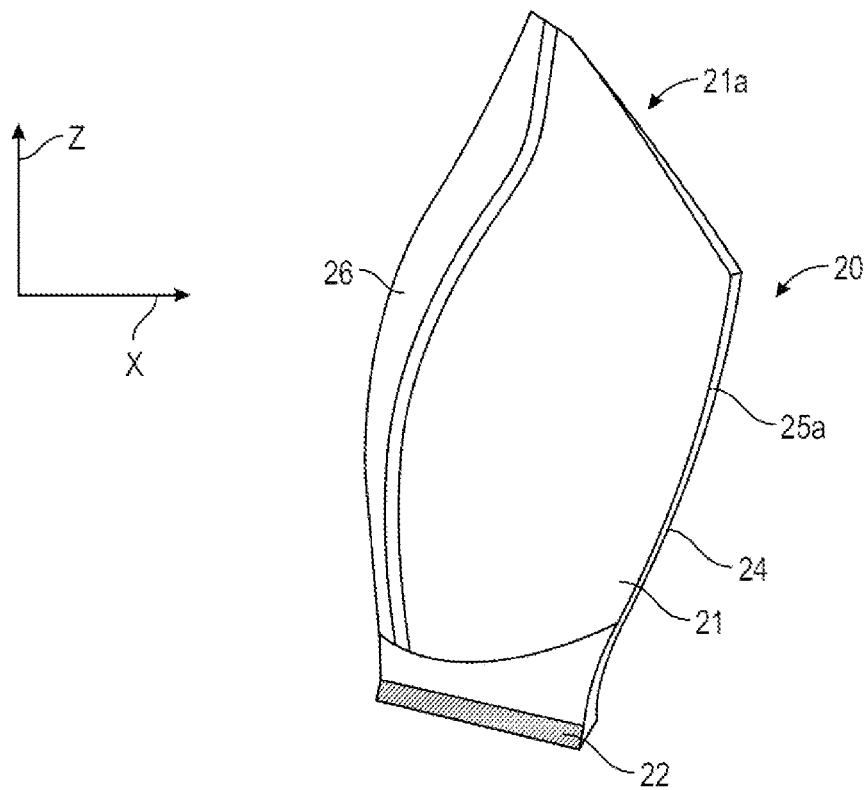
FIG. 2 is a schematic perspective view of a vane according to the disclosure.

As can be seen in FIG. 2, the vane 20 comprises a blade 21 and a protective shield 26. The blade 21 is secured to a root 22, for example.

The vane 20 extends along an axis of elongation Z. The axis of elongation Z extends transversely to the longitudinal axis X of the turbine engine 1. The vane 20 has a free end 21a opposite the root 22. The free end 21a faces the abradable layer 12. The root 22 cooperates with a corresponding groove (not shown) in the disk 2a to attach the vane 20 to the disk 2a.

The blade 21 is made of composite material. The composite material comprises a matrix and fibers embedded in the matrix. The composite material is, for example, an organic matrix composite (OMC). The matrix is, for example, a thermoplastic or thermosetting polymer matrix. The fibers are, for example, carbon fibers or glass fibers. For example, the fibers are organized in the form of a fibrous preform. The blade 21 is made, for example, by resin transfer molding, injection molding or draping.

The blade 21 has an aerodynamic profile. The blade 21 comprises a leading edge 23 and a trailing edge 24 joined by a suction side 25a and a pressure side 25b opposite the suction side 25a.

The protective shield 26 is attached to the blade 21. The protective shield 26 is made of metal, for example. The metallic material is titanium, for example.

The protective shield 26 has an elongated shape along the axis of elongation Z and extends along the blade 21, and in particular along the leading edge 23.

Figure 3:
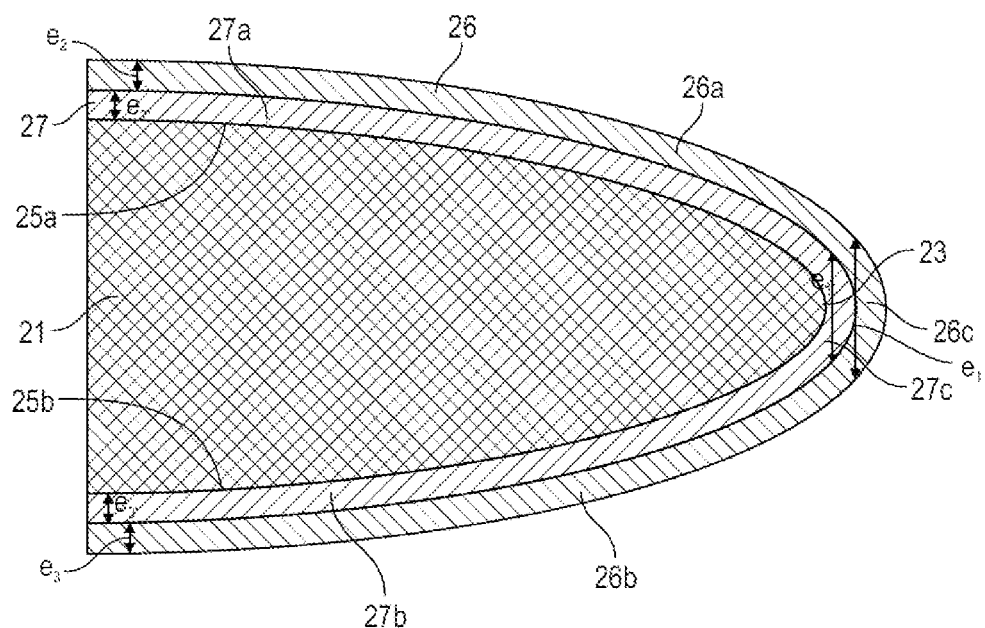
FIG. 3 is a partial cross-sectional view of the vane in FIG. 2 in which the adjustment cavity has been omitted for clarity.

As can be seen in FIG. 3, the protective shield 26 has a dihedral-shaped cross-section and comprises a first lateral fin 26a and a second lateral fin 26b. The first and second lateral fins 26a, 26b are connected by a central portion 26c. The first lateral fin 26a extends over at least part of the suction side 25a and the second lateral fin 26b extends over at least part of the pressure side 25b. The central portion 26c covers the leading edge 23. Advantageously, the central portion 26c has, for example, a thickness e1 as measured in a direction transverse to the axis of elongation Z greater than the thickness e2, e3 respectively of the first and second lateral fins 26a, 26b. The first and second lateral fins 26a, 26b are tapered towards the trailing edge 24 of the blade 21 and fit snugly against the pressure side 25b and suction side 25a respectively. The thicknesses e2, e3 of the first and second lateral fins 26a, 26b decrease towards the longitudinal ends of the protective shield 26 opposite the central portion 26c.

Figure 5:
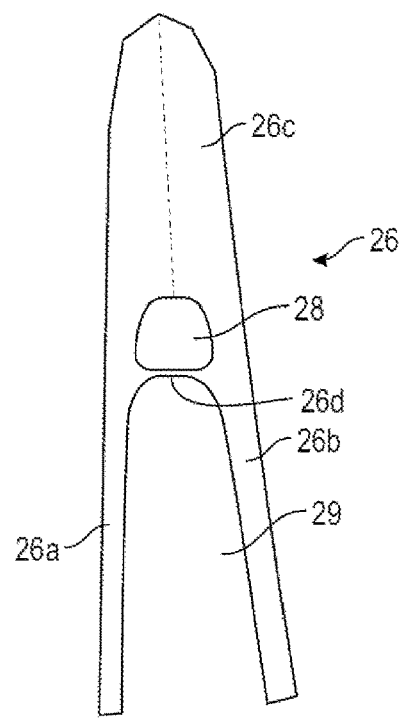
FIG. 5 is a cross-sectional view of the protective shield according to the first embodiment of the disclosure.

In addition, as can be seen more clearly by way of example in FIG. 5, the protective shield 26 comprises a receiving cavity 29. The leading edge 23 is arranged in the receiving cavity 29. The receiving cavity 29 extends along the leading edge 23 along the axis of elongation Z. The receiving cavity 29 is delimited laterally by the first and second lateral fins 26a, 26b. More particularly, the receiving cavity 29 is generally U-shaped or V-shaped. The receiving cavity 29 comprises a first wall formed by the first lateral fin 26a, a second wall formed by the second lateral fin 26b and a transverse wall 26d connecting the first and second side walls. The protective shield 26 protects the leading edge 23 from external impact and wear, for example.

The protective shield 26 is attached to the blade 21 by gluing, for example. The vane thus comprises an adhesive layer 27 arranged between the protective shield 26 and the blade 21.

The adhesive layer 27 has a U-shaped cross-section. The adhesive layer 27 comprises a suction side fin 27a arranged between the pressure side 25a of the blade 21 and the first lateral fin 26a of the protective shield 26 and a pressure side fin 27b arranged between the suction side 25b of the blade 21 and the second lateral fin 26b of the protective shield 26. The adhesive layer 27 also comprises a central base 27c connecting the suction side fin 27a and the pressure side fin 27b. The central base 27c is arranged between the leading edge 23 and the central portion 26c of the protective shield 26.

The central base 27c has a first thickness e1', as measured in a direction transverse to the axis of elongation Z, greater than the second and third thicknesses e2', e3' of the suction side and pressure side fins 27a, 27b respectively. The second and third thicknesses e2', e3' are advantageously identical.

The first thickness e1' is, for example, between 1 mm and 10 mm. The second thickness e2' is, for example, between 0.10 mm and 0.50 mm, preferably between 0.10 mm and 0.35 mm. The third thickness e3' is advantageously identical to the second thickness e2'. The adhesive layer 27 is made, for example, of a polymeric material preferably chosen from epoxy resins. The polymeric material has a density of between 1 g/cm3 and 2 g/cm3, for example.

According to the disclosure, the vane 20 comprises at least one adjustment cavity 28 extending at least partly along the leading edge 23, along the axis of elongation Z.

According to an advantageous embodiment of the disclosure, the adjustment cavity 28 extends over at least part of the height of the leading edge 23 along the axis of elongation Z. Preferably, the adjustment cavity 28 extends over the entire height of the leading edge 23 along the axis of elongation Z. The adjustment cavity 28 can therefore accommodate a larger quantity of material to precisely adjust its radial moment weight. The vane 20 is therefore balanced. The adjustment cavity 28 is closed at its longitudinal ends along the axis of elongation Z.

Advantageously, the vane 20 comprises at least a first material (not shown) arranged in the adjustment cavity 28. The first material is, for example, powder. The quantity of the first material is advantageously between 5 g and 50 g, preferably between 5 g and 30 g, for example between 10 g and 30 g and even more preferably between 10 g and 20 g. The first material has a density of between 5 g/cm3 and 15 g/cm3, for example. The first material is lead, for example. The first material is used to adjust the radial moment weight of the vane 20.

In order to more accurately adjust the radial moment weight of the vane 20, and/or to fill the remaining space of the adjustment cavity 28 to prevent movement of the first material therein, the vane 20 optionally comprises a second material (not shown) arranged in the adjustment cavity 28. The second material has a different density to the first material. For example, the density of the second material is lower than the density of the first material. The quantity of the sum of the first and second materials is advantageously between 10 g and 20 g, preferably between 5 g and 20 g and even more preferably between 10 g and 20 g. The ratio between the weight of the first material and the second material is between 0 and 1.

The second material is polymeric, for example. The polymeric material is chosen from thermoplastics or thermosets, such as an epoxy-type resin. The second material is, for example, identical to the material of the adhesive layer 27. This simplifies the manufacturing method, since the behavior of the materials is identical.

Figure 4:
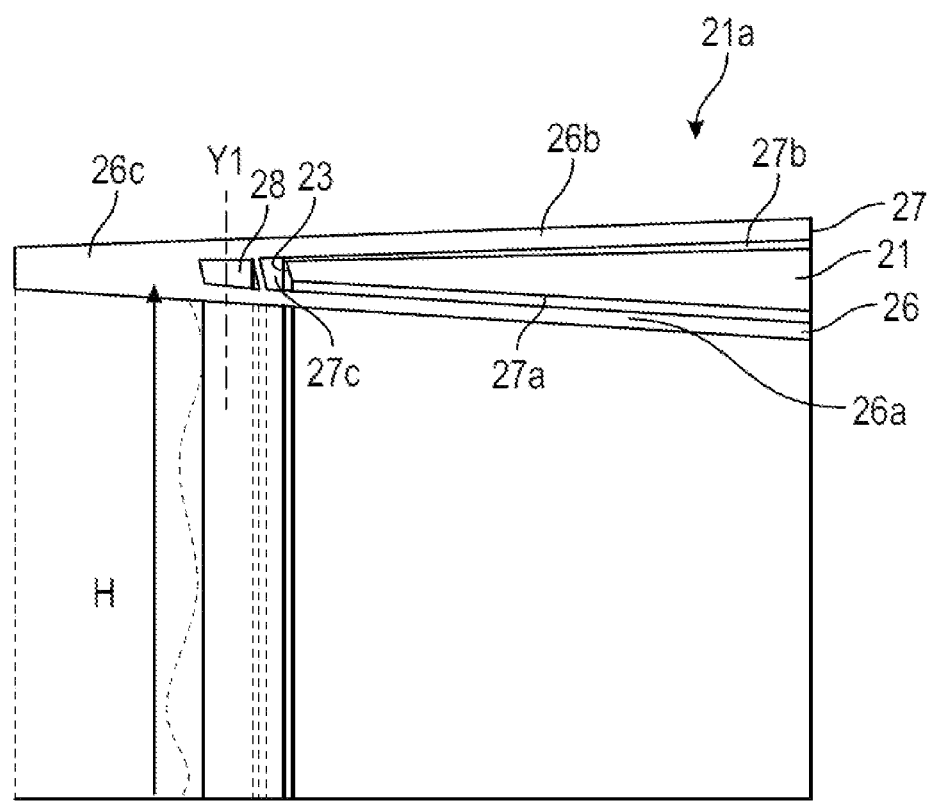
FIG. 4 is a schematic representation of part of a vane according to a first embodiment of the disclosure.

In a first embodiment shown in FIG. 4, the adjustment cavity 28 is formed in the protective shield 26. For example, the adjustment cavity 28 is formed in the central portion 26c. This allows the radial moment weight of the vane 20 to be adjusted without affecting the quality of bonding of the protective shield 26 to the blade 21. Also, the central portion 26c has a substantially elongated profile which makes it easy to have an adjustment cavity 28 along the entire length of the protective shield 26 and to reduce its torque master in order to preserve the mechanical properties of the protective shield 26.

The adjustment cavity 28 has a central axis Y1 parallel to the axis of elongation Z. The height H of the adjustment cavity 28 measured along its central axis Y1 is advantageously between 100 mm and 500 mm, for example between 200 mm and 400 mm and preferably 350 mm. Preferably, the adjustment cavity 28 according to this example extends over the entire height of the vane 20. The adjustment cavity 28 is partly delimited by the central portion 26c.

Figure 6:
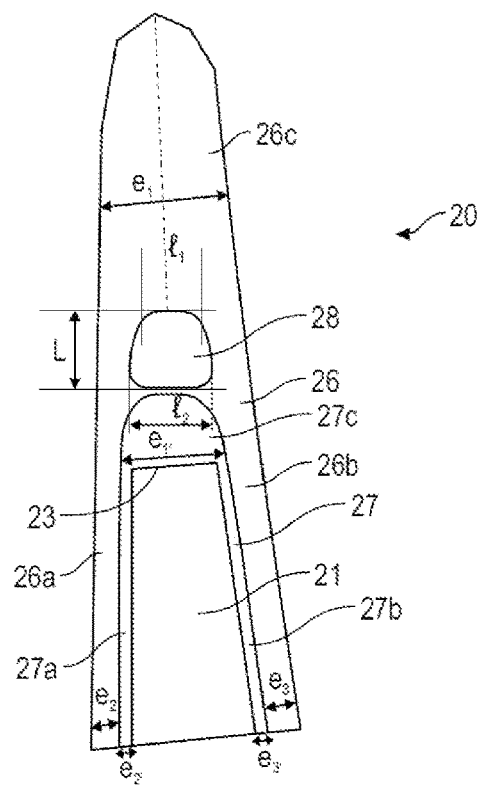
FIG. 6 is a partial cross-sectional view of the vane in FIG. 4.

As shown in FIG. 6, for example, the adjustment cavity 28 has a trapezoidal cross-section. The trapezoid has a height L of between 1 mm and 10 mm, for example between 1 mm and 5 mm and in particular between 2 mm and 4 mm, an internal base of length 12, of between 1 mm and 10 mm, for example between 1 mm and 5 mm and in particular between 2 mm and 4 mm, and an external base of length 11, of between 1 mm and 10 mm, for example between 1 mm and 5 mm and in particular between 2 mm and 4 mm. The lengths 11 and 12 may be different in order to adapt the shape of the adjustment cavity 28 to the geometry of the protective shield 26, as shown, or of the same dimensions. According to an example not shown, the adjustment cavity 28 has a circular, elliptical, ovoid or polygonal cross-section.

Figure 7:
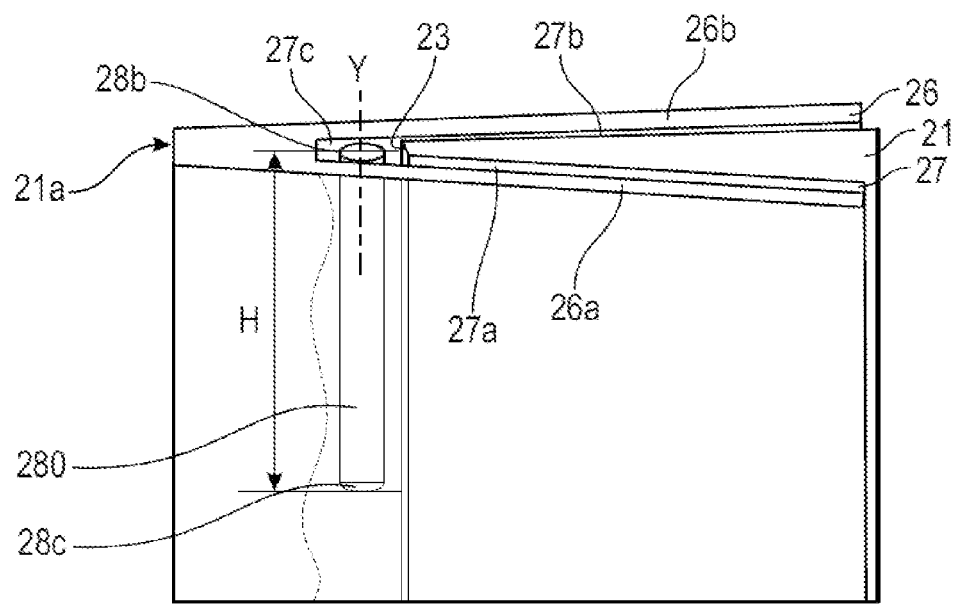
FIG. 7 is a schematic representation of part of a vane according to a second embodiment of the disclosure.

In a second embodiment, shown for example in FIG. 7, the adjustment cavity 28 is formed in the adhesive layer 27. The adjustment cavity 28 is preferably inserted into the central base 27c. In this embodiment, the adjustment cavity 28 is defined by an insert 280. The insert 280 is hollow. The adjustment cavity 28 is located in the insert 280. The insert 280 is arranged in the thickness of the adhesive layer 27, preferably in the central base 27c. In fact, the central base 27c is subject to very little stress and makes only a small contribution to the bonding force of the protective shield 26 to the blade 21, unlike the pressure side and suction side fins 27a, 27b. The addition of the insert 280 in this part of the adhesive layer 27 therefore has only a slight impact on the adhesive strength of the protective shield 26 on the blade 21. The properties of the vane 20 are preserved. Thus, this embodiment, allows a vane 20 to be supplied with an adjustable radial moment weight without affecting its mechanical properties.

The insert 280 extends at least partly along the leading edge 23 along the axis of Elongation Z. The insert 280 extends between an upper longitudinal end 28b and an opposite lower longitudinal end 28c along the axis of elongation Z. The insert 280 is cylindrical and elongated along an axis of revolution Y. The axis of revolution Y is parallel to the axis of elongation Z. The height H of the insert 280 in this embodiment, measured along the axis of revolution Y, is advantageously between 100 mm and 200 mm, for example between 150 mm and 200 mm. The insert 280 is made of polymeric material, for example. The polymeric material is chemically compatible with the material of the adhesive layer 27.

In a first example of embodiment shown in FIG. 7, the insert 280 has a circular cross-section. The internal diameter of the insert 280 is advantageously between 1 mm and 5 mm.

Figure 8:
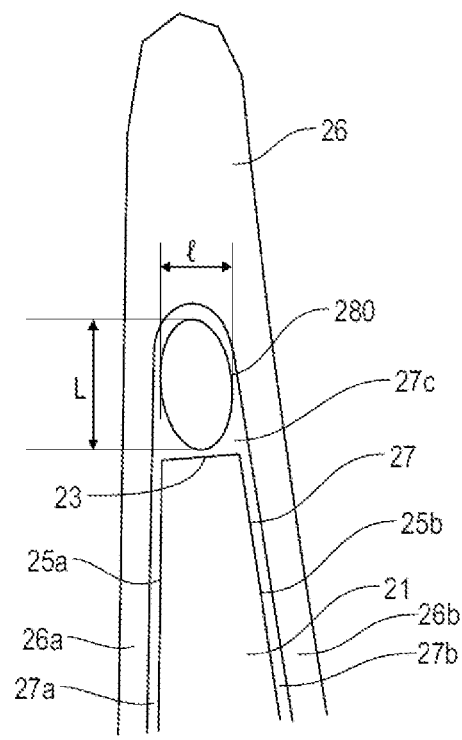
FIG. 8 is a cross-sectional view of the vane in FIG. 7.

According to another example shown in FIG. 8, the insert 280 has an elliptical cross-section. In this embodiment, the insert 280 has a large diameter L measured along the long axis, for example between 2 mm and 4 mm, and a small diameter I measured along the short axis, for example between 2 mm and 4 mm. The large diameter L is advantageously greater than the small diameter I.

A method for correcting the radial moment weight of the vane 20 will now be described with reference to FIGS. 10 and 11.

The method comprises a first step (a) of supplying the vane 20 as described above. The step (a) of supplying the vane 20 may comprise the following sub-steps:
(a00) supplying the blade 21,
(a01) supplying a protective shield 26,
(a02) applying the adhesive layer 27,
(a03) bonding the protective shield 26 to the blade 21, and
(a1) forming the adjustment cavity 28 in the vane 20.

The sub-steps (a00) for supplying the blade 21 and (a01) for supplying the protective shield 26 can be carried out in parallel.

Figure 10:
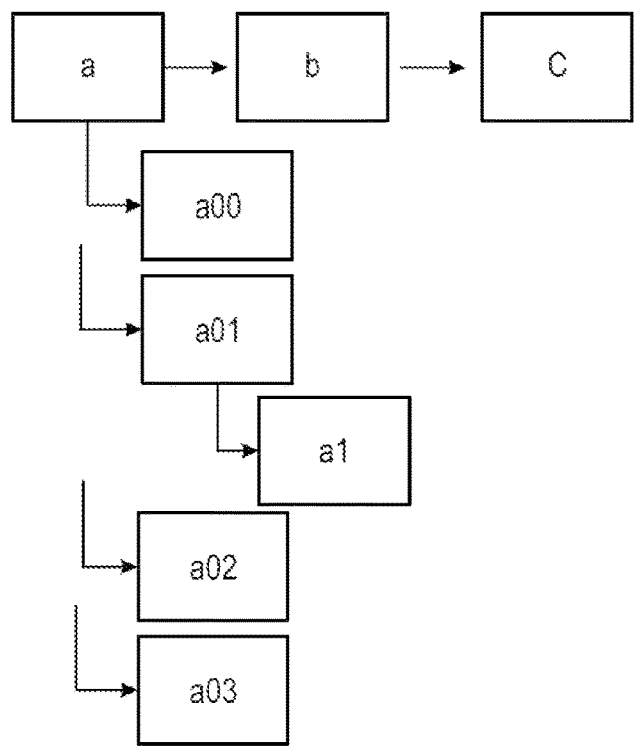
FIG. 10 is a block diagram of a manufacturing method for the vane of the first embodiment.

As illustrated in FIG. 10, according to the first embodiment in which the adjustment cavity 28 is provided in the protective shield 26, the sub-step (a1) of forming the adjustment cavity 28 is carried out during the sub-step (a01) of providing the protective shield 26. For example, the protective shield 26 is formed by folding metal sheets and welding the transverse ends of the sheets around a support element to form the adjustment cavity 28. The support element is fugitive, i.e., it is present during this sub-step but absent at the end of the step (a). The support element is therefore not present in the vane 20.

Figure 9:
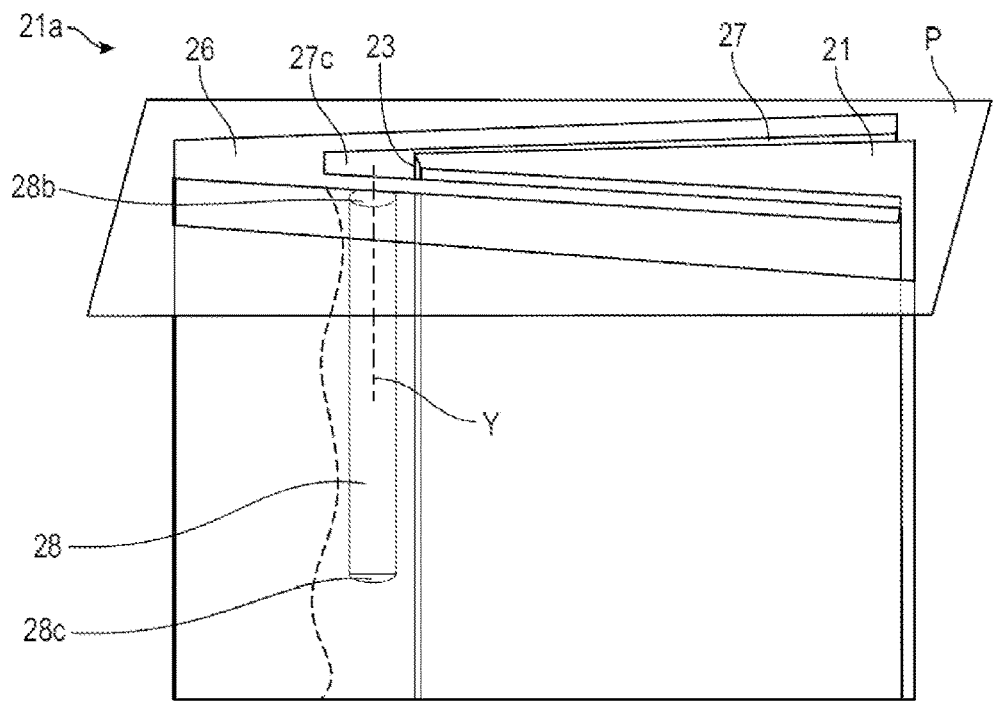
FIG. 9 is a partial schematic representation of the vane in FIG. 7 in one stage of the method.
Figure 11:
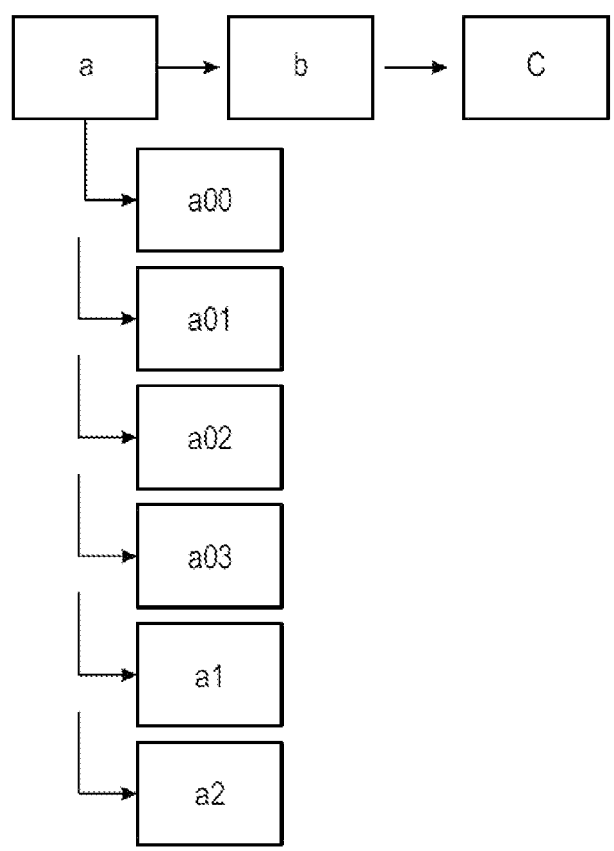
FIG. 11 is a block diagram of a manufacturing method for the vane of the second embodiment.

As illustrated in FIG. 11, according to the second embodiment in which the adjustment cavity 28 is formed in the adhesive layer 27, the sub-step (a1) is advantageously carried out after the sub-step (a03) for bonding the protective shield 26. In sub-step (a1) the insert 280 is arranged in the adhesive layer 27. In this sub-step, the adjustment cavity 28 is closed at both its longitudinal ends. As illustrated in FIG. 9, according to this second embodiment, after the sub-step (a1), the method comprises a sub-step (a2) of cutting or removing an end portion of the vane 20, opposite the root 22, so as to open the upper end of the adjustment cavity 28 opposite the root 22. The cutting is carried out according to a cutting plane P transverse to the axis of revolution Y or the axis of elongation Z of the vane 20.

In step (a), the adjustment cavity 28 opens onto the free end 21a of the vane 20. This configuration allows access to the adjustment cavity 28 after the vane 20 has been manufactured, making it easier to adjust its radial moment weight.

In a second step (b), the radial moment weight is measured.

In a third step (c), the radial moment weight measured in step (b) is compared with a reference value. This step determines the adjustment required to reach the reference value. The radial moment weight of the vane 20 is then adjusted according to the result of the comparison. According to the disclosure, the adjustment is carried out by inserting the first material into the adjustment cavity 28.

Advantageously, the adjustment during step (c) is carried out by inserting the second material into the adjustment cavity 28 in combination with the first material. This enables the radial moment weight of the vane 20 to be adjusted more precisely by using materials of different densities. The insertion of the second material also allows the adjustment cavity 28 to be closed. A step of polymerization of the second material can be carried out. Thus, according to the disclosure, it is possible to adjust the radial moment weight of the vanes 20 individually during their manufacture. This allows this parameter to be homogenized during manufacture and avoids the creation of an imbalance on the rotor of the fan, for example after the mounting of the vanes 20, resulting from a dispersion of the radial moment weight of the vanes 20. For example, the radial moment weight of the vanes 20 can be adjusted by at least 5 g.cm, for example from 5 g.cm to 20 g.cm and for example 15 g.cm.

The invention claimed is:

1. A method for correcting a radial moment weight of a vane for an aircraft turbine engine, the method comprising the following steps:
(a) providing the vane extending along an axis of elongation between a free end and opposite a root, the vane comprising a blade made of composite material and having a leading edge, a trailing edge connected to the leading edge by a suction side, and a pressure side opposite the suction side, the vane further comprising a protective shield attached to the leading edge;
(b) measuring the radial moment weight of the vane; and
(c) comparing the measured radial moment weight with a reference value and adjusting the radial moment weight of the vane as a function of the result of the comparison, wherein in step (a), the vane comprises at least one adjustment cavity extending along the leading edge and opening onto the free end of the vane, and in step (c), the adjustment is carried out by inserting a first material into the adjustment cavity.

2. The method according to claim 1, wherein in step (c) the adjustment is carried out by inserting a second material into the adjustment cavity, the density of the first material being different from the density of the second material.

3. The method according to claim 1, wherein the first material is lead.

4. The method according to claim 1, wherein a quantity of the first material is between 5 g and 50 g.

5. The method according to claim 1, wherein the adjustment cavity is formed in the protective shield.

6. The method according to claim 5, wherein the protective shield comprises a first lateral fin extending over at least part of the suction side, a second lateral fin extending over at least part of the pressure side, a central portion connecting the first and second lateral fins and extending along the leading edge along the axis of elongation, the adjustment cavity being formed in the central portion.

7. The method according to claim 6, wherein the adjustment cavity extends over an entire height of the leading edge along the axis of elongation.

8. The method according to claim 1, wherein the vane comprises an adhesive layer disposed between the blade and the protective shield, the adjustment cavity being formed in the adhesive layer.

9. The method according to claim 1, wherein step (a) comprises the following sub-step (a1):
forming the adjustment cavity in the vane.

10. The method according to claim 9, wherein at the end of sub-step (a1), the adjustment cavity has an upper longitudinal end opposite the root and a lower longitudinal end opposite the upper longitudinal end along the axis of elongation which are closed, and in that the method further comprises, after the sub-step (a1), the following sub-step (a2):
- cutting or removing an end portion of the vane, opposite the root, so as to open the upper longitudinal end of the adjustment cavity.

11. The method according to claim 4, wherein the quantity of the first material is between 10 g and 30 g.

* * * * *